March 6, 1962  E. G. BECK  3,024,002
HEAT EXCHANGER
Filed Oct. 17, 1957  2 Sheets-Sheet 2
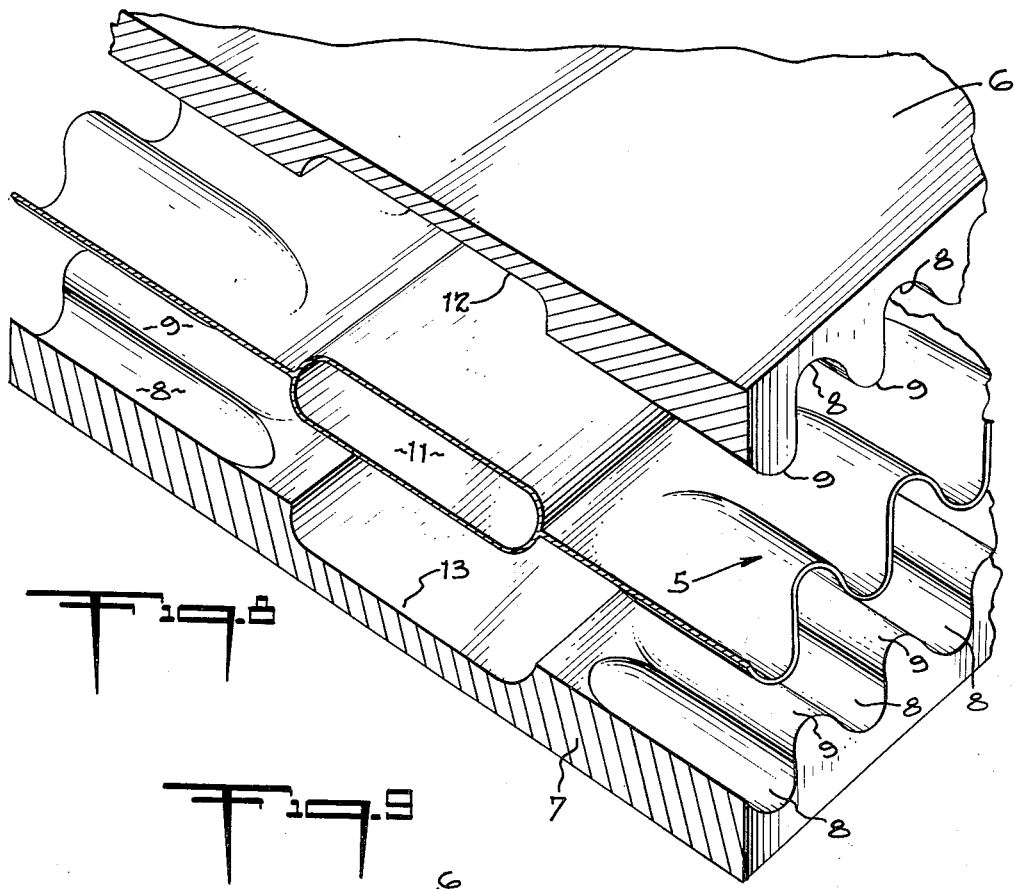
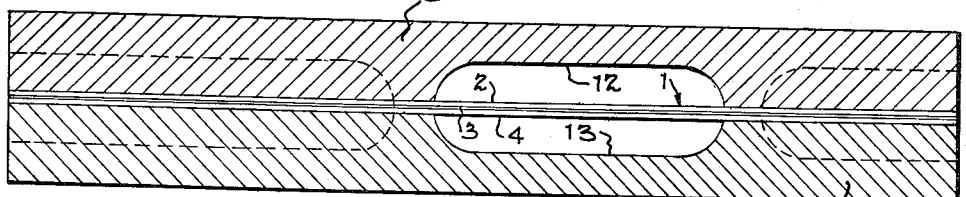
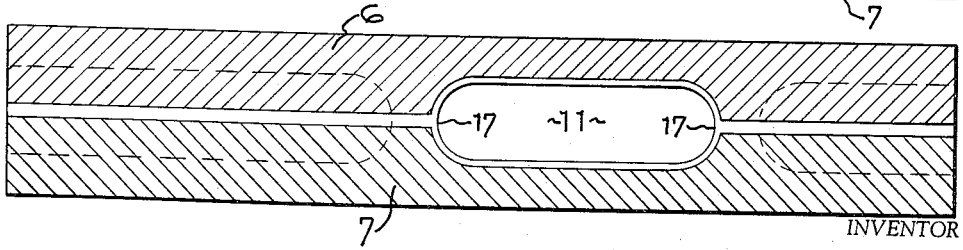
INVENTOR
Edward G. Beck.
BY Wood, Herron & Evans.
ATTORNEYS.

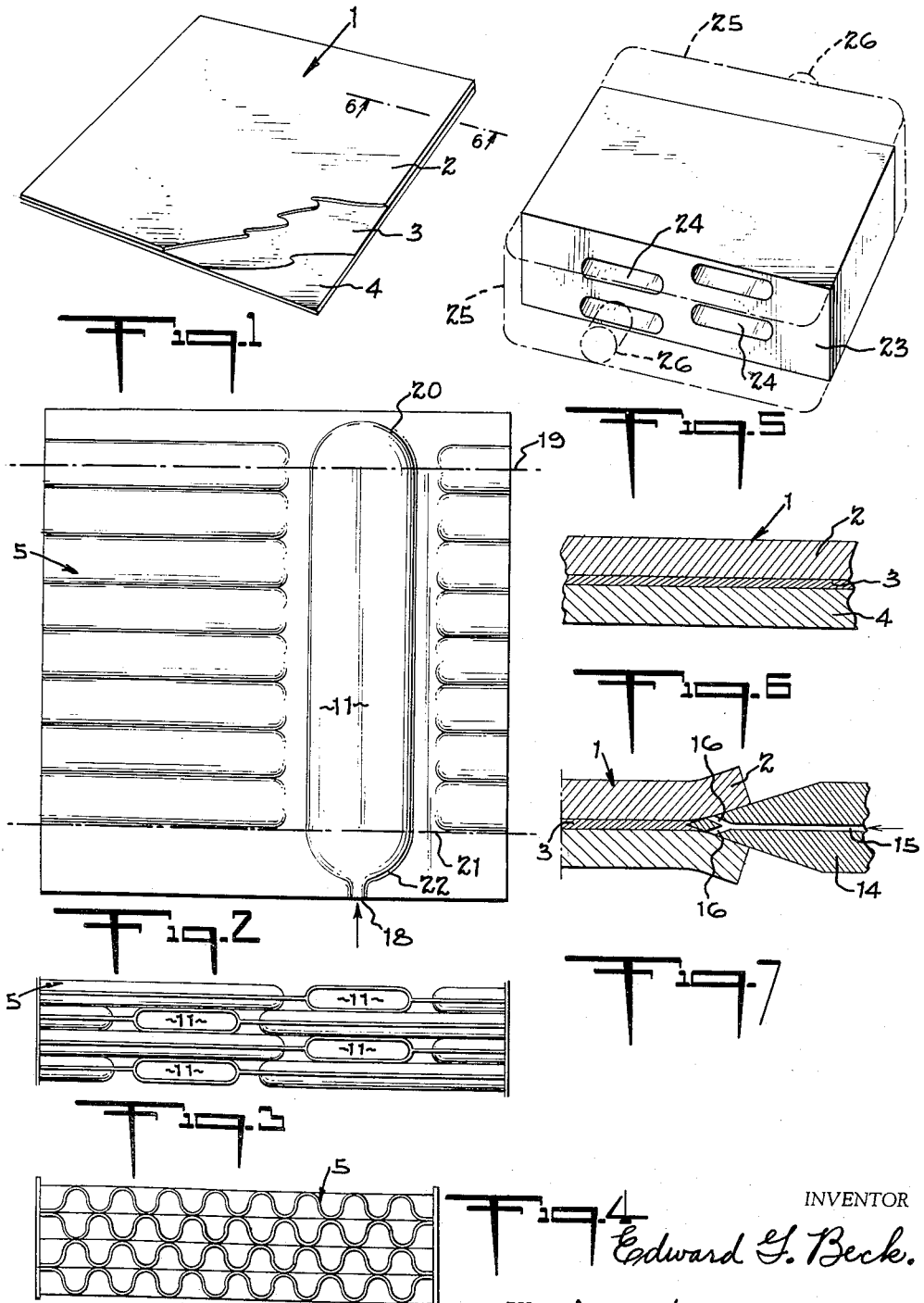

3,024,002
HEAT EXCHANGER
Edward G. Beck, Fort Thomas, Ky., assignor to The Stolle Corporation, Cincinnati, Ohio, a corporation of Ohio
Filed Oct. 17, 1957, Ser. No. 690,658
5 Claims. (Cl. 257—124)

This invention relates to integral chambered sheet metal heat exchanger elements. The exchangers may be fabricated from sheets of aluminum, steel, copper, nickel, titanium and other metals which can be bonded together interfacially, and also from various alloys of these metals. A heat exchanger constructed in accordance with the principles of this invention is compact, highly efficient, flexible in shape and application, and can easily be fabricated in widely varying capacities. It is apparent that such an exchanger may be utilized for many industrial purposes, but the invention is specifically disclosed herein in relation to the fabrication of an improved aluminum heat exchanger of the general type which is suitable for use in transferring heat between a fluid in a closed system and free air.

The term "chambered sheet metal heat exchanger" is utilized herein to designate a fabricated sheet metal structure which comprises a plurality of metal sheets which are bonded together to constitute an integral structure over part only of their facial areas, the remaining or unbonded areas being separated to provide spacing between the sheets. The areas along which the sheets are spaced from one another are the passageways which contain the fluids being heated or cooled, as the case may be.

The overall method of this invention involves the concept of fabricating corrugated and chambered sheet metal structures or elements from a type of sheet metal laminate, commonly called a "sandwich sheet." A sandwich sheet is constituted by two or more sheets of metal bonded together over opposed areas by a metal interlayer or bonding core. This bonding core must have a lower melting point than either of the metals of the bonded sheets. This melting point is hereinafter referred to as the "brazing temperature."

This invention is predicated upon the discovery and determination that, if corrugations or flutes are stamped into a sandwich sheet, and the sheet is heated to brazing temperature while positively confined between the stamping dies, the die faces having one or more cavities, the bonded sheets can be separated throughout the cavity areas by the application of fluid pressure to the molten metal of the brazing core between the sheets in these areas, to form a chambered, corrugated heat exchanger element.

The stamping operation involves pressing corrugations or flutes into the sandwich sheet in selected areas by means of forming dies. The corrugations increase the heat exchanging surface of the element. In addition, they provide a means whereby the element may be "gripped," that is, held securely in the dies, during the chambering operation so as to prevent buckling or warping of the surface of the element as a result of the stresses set up during that operation. Combining the corrugating and chambering functions in the same die and operation also obviates the difficulties inherent in a procedure in which the chambering operation would be done first in one die and the corrugating operation subsequently in a separate die.

The chambering operation involves disrupting the brazing core in the selected areas, drawing the metal of one or both of the bonded sheets to separate the sheets, expanding the metal to fill out into the cavity or cavities, and thereby providing one or more chambers in the laminate.

The disrupting and expanding operation is most easily accomplished by the use of a gas under pressure, although for some purposes the use of liquids under pressure may be desirable. The gas may be atmospheric air, nitrogen, oxygen, argon, hydrogen, carbon dioxide, or any of the other commonly available commercial gases, or compatible mixtures thereof. The gas may be chosen with regard to availability, cost and chemical action in respect to the metals being processed. Superheated steam may also be used if desired.

In performing the operation of disrupting the brazing core by fluid pressure and drawing and expanding the outer sheets of the sandwich over the disrupted areas, the confining force of the dies preferably should be greater than the expanding fluid force in order to limit the internal disruption of the sandwich sheet to the unconfined areas.

In general, the disruption of the molten brazing core requires less pressure than the further expansion of the metal of the outer sheets to fill the mold cavities. On this account the pressure should be applied so as to rip the sheets apart progressively over the unconfined areas, but the pressure must be applied against a dead end which confines the fluid and permits pressure to build up to further expand the metal sheets. The pressure of the dies must also be sufficiently great to immobilize the brazing core and prevent lateral leakage of the gas between the sheets.

At present, chambered sheet metal laminates are produced by processes which do not utilize sandwich sheets as the starting material and hence, have no brazing core. In such structures the bond between the sheets over their laminated areas is in the nature of a weld. Hence, the chambers of an expanded duplex product inherently are characterized by sharp angular edges or notches. This characteristic tends to give rise to failure from fatigue and otherwise presents a condition of concentrated stress in the structure. Also, if the laminate is used as a heat exchanger of chemical substances, the notches provide foci for corrosion and sedimentation.

The preferred specie of chambered sheet metal laminate of this invention, on the contrary, is characterized by chamber margins which are constituted by fillets of brazing core metal which cover and round out the joints between the bonded sheets. Otherwise expressed, the marginal areas of the flared chamber walls are brazed together by fillets of brazing core metal which are integral with the brazing core between the sheets over their unexpanded areas. The fillets provide a stronger structure and eliminate all disadvantages incidental to the use of chambers having sharply angulated margins along the joints of the bonded sheets of the laminate. The degree of fillet formation depends somewhat on the thickness of the brazing core and on the die pressure employed. The combination of a relatively thick brazing core and a relatively high die pressure tends to produce a relatively heavy fillet. On the other hand, the fillet formation, while preferred, is not necessary, and the invention may be practiced with brazing core thicknesses and die pressures which produce little, if any, fillet formation.

In substance, therefore, this invention contemplates the fabrication of a hollow, chambered element or unit by heating a sandwich sheet constituted by two sheets of metal secured together by a brazing core having a lower melting point than the outer sheets to a temperature within the melting range of the brazing core but below that of the outer sheets. The heating is done while the sheet is pressed between configurated dies which both deform a portion or portions of the sandwich sheet and at the same time permit expansion of another portion or portions of the sandwich sheet. Expansion is accomplished by injecting fluid under pressure between the outer layers of the sandwich sheet in the area or areas in which the two dies permit expansion thereby forming chambers or passageways within the sheet. The area or areas thus expanded constitute chambers, the walls of which are each of a thickness which is essentially equal to one layer of metal. The configurated portions, on the other hand, each are of a thickness equal to two layers of metal plus the thickness of the brazing core.

Reference is now made to the following detailed description of the drawings in which:

FIGURE 1 is a diagrammatic perspective view of a bonded metal sheet which constitutes the blank with which the practice of the invention starts;

FIGURE 2 is a plan view showing a chambered and configurated structure fabricated from the basic sheet illustrated in FIGURE 1. The structure in this view is in the condition in which it leaves the dies;

FIGURE 3 is an end elevation of four finished chambered structures stacked one on top of the other, in staggered relationship;

FIGURE 4 is a side elevation of the stack of chambered structures;

FIGURE 5 is a diagrammatic perspective view of the stack shown in FIGURES 3 and 4 enclosed on two sides by tube headers constituting a completed heat exchanger that is the end product of the invention described herein;

FIGURE 6 is an enlarged fragmentary section along the line 6—6 of FIGURE 1 showing the bonding core interposed between the two metal outer sheets;

FIGURE 7 is a sectional view showing a pointed injection nozzle being inserted into the bonding core of the metal blank of FIGURE 1;

FIGURE 8 is a diagrammatic perspective, in section, showing the corrugated and chambered metal structure and with the forming dies open at the completion of a stamping and chambering process;

FIGURE 9 is a diagrammatic cross-sectional view showing the blank in the die upon the completion of the stamping operation but before the chambering operation has been started;

FIGURE 10 is a view similar to FIGURE 9, but showing the sandwich sheet in the dies after the completion of the chambering operation.

According to the present invention, the fabrication of heat exchangers begins with a metal sandwich sheet, indicated generally at 1, constituted by a top sheet 2, a layer or film of bonding material 3, and bottom sheet 4 in facial bond with one another. This is best shown in FIGURES 1 and 6. Ordinarily, but not necessarily, the top sheet 2 and the bottom sheet 4 are of the same material and of the same dimensions. Thus, in a heat exchanger for a refrigerating unit, both would typically be of sheet aluminum. More unique installations might perhaps require certain characteristics for one of the sheets, but not for the other, so that a sheet of two different metals is called for. The invention is adaptable to such requirements, although in this application I shall presume both sheets to be of the same material and thickness.

The thickness of the bonding core 3 relative to that of the exterior sheets 2 and 4 is somewhat exaggerated in FIGURES 6, 7 and 9. The exaggeration is utilized only to show that layer clearly. More correctly it is to be conceived as a film adhering the two exterior sheets, rather than as a spacing sheet. The bonding core is a metal having a lower melting temperature than either of the two sheets to which it is bonded. The term "brazing core" is used broadly to include materials properly termed solders as well as those strictly identified as brazes.

The two sheets may be bonded together by any of the commonly known methods or techniques. For example, either the top sheet 2 or the bottom sheet 4 may be plated, dip-coated or otherwise provided on one surface with a superficial layer of bonding core and thereafter pressure bonded to the other sheet. Or the top sheet 2, the bonding material 3 (in this case, in sheet form) and the bottom sheet 4 may be simultaneously roll pressure bonded together in an operation commonly termed "cladding."

This invention is predicated on the idea of carrying out the stamping and chambering operations without removing the sandwich sheet from the dies. The process is illustrated in FIGURES 8, 9 and 10. In the fabrication of a heat exchanger such as that shown, the process involves two separate steps. In the first step, corrugations, indicated generally at 5, are stamped into the blank by means of dies, 6 and 7, of conventional design. FIGURE 9 shows this step. The sandwich sheet is pressed between the upper die 6 and the lower die 7, opposing sets of cavities 8 and heads 9 registering to form the corrugations 5. In the second step, the chamber 11 is formed. The dies 6 and 7 are heated to a temperature within that range in which the bonding core 3 is liquid and in which the outer sheets 2 and 4 remain solid. The means by which the dies are heated are not shown in the drawings. Preferably both dies are hollow, accommodating gas burners as the heating means. However, other means such as electrical induction may be used. The dies may be heated to the desired temperature prior to and during the stamping operation, so that the core is liquid throughout the entire process, or alternatively the dies may be heated just prior to the chambering operation. Because of the time required to heat dies of large mass, from an efficiency standpoint it is preferable to maintain them at the required temperature throughout both operations.

The chambering process, during which the two outer sheets are disrupted from one another and forced into chamber cavities 12 and 13 of the dies 6 and 7, sets up stresses in the unchambered areas of the sheet. These stresses are often severe enough to warp the sheet so that it is no longer planar. Furthermore, since the surface area of the chambered sheet is greater than that of the unchambered sheet, additional stresses, caused by a redistribution and flow of the metal under the double pressures of the dies and the disruptive fluid, tend to warp the sheet. These stresses may manifest themselves as the cause of surface buckling or irregularity, or they may cause the edges of the sheet to lose their linearity and become inwardly curved. I have discovered that such warpage may be prevented if the chambering operation is carried out while the sheet is anchored by the stamping dies, that is, while the corrugations on the sheet are held rigidly within the cavities of the die that formed them. The die pressure is maintained to hold the sheet so tightly that no warpage can occur anywhere over its entire surface. The corrugations themselves give the die a means of "gripping" the sheet, so that it cannot move laterally or "stretch" during chambering.

This idea is equally adaptable to the chambering of plane or noncorrugated sheets. In such case a flange or shoulder is stamped into the sheet in areas that are beyond the predetermined finished dimensions of the sheet. By these flanges the die may grip the sheet securely during chambering. After chambering, the flange is trimmed off. In essence the process is that of providing a coextensive part of the sheet angularly disposed to the general plane of the die which affords a means by which it may be securely held during chambering.

With the corrugated sheet clamped between opposing dies and heated to the brazing temperature, the outer sheets 2 and 4 are expanded into the mold cavities 12 and 13 by application of fluid or gas pressure. A sharp-pointed injection nozzle 14 (FIGURE 7) is inserted into the brazing core 3 in the region to be chambered. The expanding medium is held under pressure in a tank (not shown). The tank is connected through a release valve by a conduit to a pre-heating furnace in which the expanding medium is heated by heating means (not shown). The heating chamber is connected by a conduit to the injection nozzle. As disclosed in FIGURE 7, the portion of the injection nozzle which penetrates the brazing core of the sheet includes a longitudinal passageway 15 which connects with the expanding medium under pressure and transverse passageways 16 angularly disposed with respect thereto, the expanding gas or fluid being discharged from the nozzle through the transverse passageways 16 into the brazing core. It is to be understood that other designs of nozzles may be employed both for injecting from the edge of the sandwich sheet and for inflating by surface perforation of one of the outer sheets of the sandwich. The application of the expanding medium to those areas of the sandwich sheet which are not confined in the first instance between the opposed surfaces of the dies in contact with the sandwich sheet therebetween causes the formation of channels between the two outer sheets. In addition the chambering operation may be accompaned by the formation of fillets, such as those indicated at 17 in FIGURE 10, which are formed by the surface tension and/or capillary flow of the fluid brazing core material. These fillets form at the places where the chambered metal is drawn away from the plane of the core and fill the junctures, rounding out and strengthening them. Whether or not the fillets are formed in the practice of the invention is dependent on the thickness of the brazing core and the die pressure employed during the chambering operation.

FIGURE 2 shows a chambered and configurated sheet in the condition in which it leaves the dies. This figure also shows the shapes of the two forming dies. The chamber 11 of the sheet is expanded by inserting the nozzle 14 at the place designated 18. The upper edgewise portion of the sheet shown in FIGURE 2 is cut along the line designated 19 to remove the closed end 20 of the chamber and the lower edgewise portion is cut along the line 21 to remove the rounded end 22 of the chamber and the connecting entry port 18 into which the expansion nozzle is inserted. After being cut as shown, the chamber 11 is of uniform cross section throughout its length. It is necessary to provide the rounded, closed end 20 during the expanding operation to build up pressure in the expanding fluid within the sandwich sheet. If desired, two expansion nozzles may be employed in the method, the rounded end 20 under these circumstances is configurated to provide an entry port similar to the one shown at 18.

The exact temperatures and pressures employed in the practice of the invention depend entirely upon the nature of the metals and/or alloys which are utilized to constitute the initial sandwich sheet as well as upon the bonding properties of the brazing core. As a generality, the temperature must be such that the brazing core is relatively fluid, or molten, or plastic, so that it is more readily disruptable than the outer sheets. The operation must be performed at a temperature below the melting point of the metal of the outer sheets of the sandwich, but within a temperature range in which the outer sheets may be expanded by the injected fluid. The die pressure depends upon the degree of deformation which is tolerable and the degree of expanding pressure required depends upon the workability of the outer sheets at the brazing temperature. All these factors must necessarily be correlated in relation to the materials of the starting sandwich sheet and design of the expanded laminate to be produced. It is essential, therefore, to properly correlate and balance die hold-down and expanding pressures to meet the operating brazing temperature requirements for each particular sandwich sheet product.

When the expanding fluid has forced the outer sheets into the die cavities insofar as is possible, i.e., upon completion of chambering, the injection nozzle is withdrawn from the chamber, the pressure on the dies is released, and the sheet is withdrawn from the dies and allowed to cool.

The end product of the practice of this invention is illustrated in FIGURES 2, 3, 4, and 5. FIGURE 2 shows the sheet of FIGURE 1 after corrugation and chambering, with the outer sheets joined by a brazing core which bonds them to provide a corrugated laminate over a major unchambered area and a configurated chambered area in the form of an off-center tubular passageway running at right angles to the corrugations.

The single corrugated and chambered sheets of FIGURE 2 are assembled as shown in FIGURES 3, 4 and 5. It will be noted that the corrugated surface is longer on one side of the chamber than it is on the other; this is so that when assembled as shown, each chamber, except the top and bottom ones of the stack, is flanked on each side by the corrugations of the adjacent sheets. Otherwise expressed, a sheet whose chamber is located to the right of its centerline is stacked on top of a sheet which has been turned over so that its chamber is located to the left of its centerline. A stack of four elements is shown. As the elements are assembled in this arrangement, bonding metal, in the form of very thin foil, is laid between the elements so that it is in contact with them. This bonding metal may be of the same type as that which constitutes the core of the sandwich sheet from which the elements are made. In any event, it should have a melting point no higher than the core material in the sandwich sheet. Tube headers 23 (FIGURE 5) having openings 24 which register with the outlets of the chambers 11 of the individual elements are secured over the ends of the stack. Manifolds 25 are secured outside the tube headers 23, having a pipe connection 26 through which the fluid to be heated or cooled is pumped. The tube headers and manifolds are made of the same alloy as the outer layers of the sandwich sheet or from similar alloys which have a melting point at least as high as the outer layers of the sandwich sheet. Bonding metal of the same alloy as used above and in appropriate form is then fastened or laid at each of the mating surfaces. The entire assembly is then placed in a furnace and raised in temperature to the melting point of the bonding metal, so that the entire unit is brazed together. FIGURE 5 shows the assembled unit.

In the operation of a heat exchanger, heat is transferred between a fluid or gas in a closed system (commonly called "captive medium"), and free air or gas which is either still, except for induced convection currents, or is blown in a definite direction with respect to the heat exchanger. For purposes of this description, the surface of the exchanger is divided into the primary heat exchanger surfaces, hereafter referred to as "primary surface," and secondary heat exchanger surface, referred to as "secondary surface." Primary surface is that which is separated from the captive medium only by the thickness of the chamber wall; all other surface is secondary surface. It will be noted that, by the use of corrugations, the secondary surface has been formed in such a manner as to increase the surface area and cause turbulence in any free air or gas passing across it. The only limiting factor in this respect is the elongation properties of the material being formed.

In a typical installation of the heat exchanger, herein described, air is forced across the secondary surfaces in a direction parallel to that of the corrugations. A liquid at a higher temperature than the air is pumped through the chambers so as to circulate through the element. In the course of flowing through the chambers, the liquid loses heat to the chamber wall, from which it is carried away either by the air flowing over primary surface, or by the secondary surface itself, in which case it is carried away by air flowing over secondary surface. It is evident that the stack of corrugated and chambered sheets is a heat exchanger of higher efficiency because of the intimate contact of the two fluids with the relatively large areas of exchange surface.

The present invention provides a heat exchanger possessing wide latitude of design possibilities. The shape of the chambers can be varied widely. A number of chambers either in series or in parallel, with secondary surfaces between them, can readily be assembled. The ratio between the area of the primary and the area of the secondary surfaces can be set at any desired value. The effect of producing configurations in the secondary surface is not only to orient the surface with respect to the direction of flow of the free air or gas in such a manner as to achieve maximum heat transfer, but also to increase the total secondary surface area obtainable from a given uniformed area of sandwich sheet.

Although the invention may be practiced with materials of a great variety of composition, the invention is disclosed specifically in relation to an aluminum sandwich sheet having an aluminum alloy core such as that disclosed in U.S. Patent No. 2,602,413, issued July 8, 1952, on the application of Mike A. Miller for "Aluminous Brazing Product and Method of Brazing," and in my own co-pending application, Serial No. 521,677, for "Chambered Sheet Metal Laminates and Method of Making."

For many types of heat exchangers, aluminum outer sheets composed of 1.25% by weight manganese plus balance substantially aluminum have been found to work well. A suitable bonding core is composed of 7.5% silicon plus balance substantially aluminum. A total thickness of about 0.08 inch is suitable, the brazing core being about .0008 inch thick, or substantially 1% of the total thickness of the sandwich sheet. The general brazing temperature range which is suitable for expanding an aluminum sandwich sheet of the above composition is substantially 1070° F. to 1160° F. The initial pressure of the expanding fluid is 150 pounds per square inch. It is preferred to progressively increase the pressure of the expanding fluid from its initial pressure up to a maximum of approximately 200–300 pounds per square inch. The maximum pressure is that pressure at which lateral exudation of the brazing core begins to occur. At a maximum fluid pressure of 200 pounds per square inch, a die hold down presure of 550 pounds per square inch is required to keep the corrugations securely anchored within the die cavities so as to prevent warpage.

Manifestly, the specific compositions, designs, temperatures and pressures herein disclosed are not to be taken as limitations on the scope of the invention, the method being easily adaptable to use with a wide range of variations or substitutions.

In summary, the heat exchanger which is hereinbefore disclosed is constituted by a plurality of identically fabricated sandwich sheets which are stacked together with their edges in alignment. Each sandwich sheet, after fabrication, is constituted by a tubular member which has a corrugated flange extending from each side thereof.

The upper and lower walls of the tube and the ridges of the corrugations are in the same plane so that the configurated units may be stacked one on another and brazed together. The tube, however, is not positioned concentrically in relation to the sandwich sheet as a whole whereby one flange, which may be termed a major flange, is longer than the other flange, which may be termed the minor flange. Further, the length of the corrugations of the major flange is greater than the combined length of the minor flange and the width of the tube. Hence, when two units are stacked reversely the corrugations of adjacent sandwich sheet overlap and define passageways which are continuous from one edge to the other edge of the unit. These passageways are at right angles to the passageways which are constituted by the expansion of the individual sandwich sheets.

Obviously, also, the method which is utilized for the fabrication of the disclosed heat exchange units may also be utilized to fabricate individual heat exchange units wherein a tube or passage for a fluid is blown into the sandwich sheet which is contemporaneously deformed or configurated to provide radiator fins of increased surface area, the configuration of the fins contemporaneously minimizing the possibility of blowout during the formation of the main passageway.

Having fully described my invention, I claim:

1. A heat exchanger constituted by a plurality of identical stacked units, each unit comprising a tubular member having corrugated flanges extending from each side thereof, one flange being longer than the combined width of the other flange and the width of the tubular member, the said units stacked with their edges in alignment but their tubular members residing in spaced parallel relationship, the ridges of the corrugations and the walls of the tubular members lying in the same plane and contacting one another, the ridges of said corrugations being aligned with one another, whereby the corrugations of adjacent units define passageways which extend from side to side of the heat exchanger, said passageways being at right angles to the tubular members within the individual units and adapted to conduct flow streams of fluid transversely across the spaced parallel tubular members.

2. The heat exchanger of claim 1 wherein the tubular members are of greater width than height and have substantially planar opposing sides.

3. The heat exchanger of claim 1 wherein the walls of the tubular members are constituted essentially by one layer of metal and the corrugated flanges are constituted by two sheets of metal, and a brazing core securing said two sheets of metal in facial engagement.

4. A heat exchanger constituted by a plurality of stacked units, each unit comprising a pair of metal sheets having portions joined in facial engagement, said sheets having other portions expanded outwardly in opposite directions and delineating a tubular chamber extending longitudinally of said pair of sheets, the facially joined portions of said sheets providing flanges extending outwardly from opposite sides of said tubular chamber in a plane generally parallel to the axis of the chamber, said flanges having corrugations formed therein which extend at an angle to the axis of the tubular chamber, said corrugations having ridges which reside in planes common to the opposite external surfaces of said tubular chamber, said units being stacked one upon another with the tubular chambers thereof residing generally in parallel spaced relationship, the ridges of the corrugations and the walls of the tubular chambers lying in the same plane and contacting one another, and a brazing core securing the contacting portions of the ridges to one another, the corrugations of the stacked units providing rows of individual longitudinally sealed passageways which extend across the heat exchanger at an angle to the tubular chambers thereof, said rows of longitudinally sealed passageways adapted to conduct flow streams of heat exchange fluid angularly across the external surfaces of the said tubular chambers.

5. A heat exchanger constituted by a plurality of stacked units, each unit comprising a pair of metal sheets having portions joined in facial engagement, said sheets having other portions expanded outwardly and delineating a tubular chamber extending longitudinally of said pair of sheets, the facially joined portions of said sheets providing flanges extending outwardly from opposite sides of said tubular chamber in a plane generally parallel to the axis of the chamber, said flanges having corrugations formed therein which extend generally at right angles to the axis of the tubular chamber, said corrugations having ridges which reside in planes common to the opposite external surfaces of said tubular chamber, said units being stacked one upon another with the tubular chambers of the stacked units residing generally in parallel spaced relationship, the ridges of the corrugations and the surfaces of the tubular chambers lying in the same plane and contacting one another, the ridges of the corrugations being aligned with one another and providing contacting interfaces, and a brazing core securing the contacting interfaces of the ridges to one another, whereby the corrugations of the stacked units delineate rows of individual longitudinally sealed passageways which extend from one side of the heat exchanger, communicate with the external surfaces of the tubular chambers thereof and continue to the opposite side of the heat exchanger, said passageways providing for the flow of heat exchange fluid through the heat exchanger and across the external surfaces of said tubular chambers generally at right angles to the axes of said chambers.

References Cited in the file of this patent

UNITED STATES PATENTS

| | | |
|---|---|---|
| 1,571,068 | Stancliffe | Jan. 26, 1926 |
| 1,751,725 | Cross | Mar. 25, 1930 |
| 2,064,141 | Askin | Dec. 15, 1936 |
| 2,158,383 | Saunders | May 16, 1939 |
| 2,347,957 | McCullough | May 2, 1944 |
| 2,517,370 | Young | Aug. 1, 1950 |
| 2,713,997 | Ruckstell | July 26, 1955 |
| 2,779,086 | Rieppel et al. | Jan. 29, 1957 |
| 2,877,000 | Person | Mar. 10, 1959 |

FOREIGN PATENTS

| | | |
|---|---|---|
| 695,640 | Great Britain | Aug. 12, 1953 |